United States Patent

[11] 3,580,587

[72] Inventors Dieter Born
 Hessheim;
 Peter Stech; Werner Huebner, Roxheim,
 Germany
[21] Appl. No. 702,001
[22] Filed Jan. 31, 1968
[45] Patented May 25, 1971
[73] Assignee Klein, Schanzlin & Becker A.G.
 Frankenthal, Pfalz, Germany
[32] Priority July 22, 1967, Aug. 11, 1967
[33] Germany
[31] DK62907 and DK63081

[54] CONTACT-FREE HYDROSTATIC SEAL
 3 Claims, 2 Drawing Figs.
[52] U.S. Cl. .................................................. 277/3,
 277/28, 277/73
[51] Int. Cl. ..................................................... F16j 15/00,
 F16i 17/00
[50] Field of Search ........................................... 277/3, 28,
 73, 59, 27

[56] References Cited
 UNITED STATES PATENTS

| | | | |
|---|---|---|---|
| 2,698,584 | 1/1955 | Stelzer ........................... | 277/3 |
| 2,706,651 | 4/1955 | Hornschuch ................... | 277/28 |
| 2,834,619 | 5/1958 | McNab ........................... | 277/28 |
| 2,895,750 | 7/1959 | Gardner et al. ................ | 277/73X |
| 3,141,677 | 7/1964 | Williams ......................... | 277/3 |
| 3,273,899 | 9/1966 | Warnery ......................... | 277/3 |
| 3,410,565 | 11/1968 | Williams ......................... | 277/3 |
| 3,395,645 | 8/1968 | Vilet ............................... | 277/59X |

*Primary Examiner*—Samuel Rothberg
*Attorney*—Michael S. Striker

ABSTRACT: A contact-free hydrostatic seal wherein a rotary first annular sealing element defines with a second annular sealing element a gap for leak fluid. The second sealing element is biased toward the first sealing element by closing springs which tend to reduce the width of the gap. A pump delivers fluid into the gap to oppose the action of closing springs and to prevent direct contact between the sealing elements. When the pressure of fluid drops to such an extent that it can be overcome by the bias of closing springs, a safety device becomes operative to oppose such bias and to hold the second sealing element away from the first sealing element. The safety device includes a set of plungers which are subjected to fluid pressure and engage the second sealing element when the pressure of fluid in the gap drops to a certain minimum permissible value, or a lever which is pivoted into engagement with the second sealing element by one or more strong springs when such strong spring or springs overcome the fluid pressure at a time when the fluid pressure is too low to prevent the closing springs from moving the second sealing element into frictional engagement with the first sealing element.

CONTACT-FREE HYDROSTATIC SEAL

BACKGROUND OF THE INVENTION

The present invention relates to hydrostatic seals in general, and more particularly to improvements in contact-free hydrostatic seals which can be utilized in pumps for nuclear reactor systems, particularly in pumps which convey coolant in boiling water reactor systems. In such reactor systems, the coolant must be circulated at a very high pressure which necessitates the provision of special seals in addition to conventional seals. A characteristic feature of boiling water reactor systems is that the operating pressure varies with changes in steam pressure. Therefore, the elements of the seal are held out of contact only if the opening forces produced by the pressure of fluid exceed the closing forces which latter tend to move the sealing elements into frictional engagement with each other. The closing forces are produced by the pressure of leak fluid and by resilient closing elements. If the difference between the closing pressure and the pressure of leak fluid decreases below a certain value, the seal closes and this brings about rapid destruction of sealing elements. These sealing elements normally include a rotary annular sealing element which rotates with the pump shaft and an axially movable sealing element which is held against rotation and defines with the rotary element a gap for leak fluid.

SUMMARY OF THE INVENTION

An object of our invention is to provide a hydrostatic seal wherein a first sealing element rotates with reference to a second sealing element and to provide such seal with a safety device which prevents frictional engagement between the sealing elements under all operating conditions.

Another object of the invention is to provide a hydrostatic seal wherein the opening force of fluid is automatically assisted when the fluid pressure drops to a value at which the gap between the sealing elements is likely to close due to the action of closing forces.

A further object of the invention is to provide a hydrostatic seal whose useful life exceeds considerably the useful life of presently known contact-free hydrostatic seals.

An additional object of the invention is to provide a hydrostatic seal wherein the fluid pressure at which a constant closing force tends to close the gap between the sealing elements can be selected and varied at will and wherein such selection or adjustment can be effected when the seal is in actual use.

Still another object of the invention is to provide a hydrostatic seal whose operation is automatic and wherein changes in fluid pressure can trigger operation of the safety device to prevent closing of the gap between the sealing elements.

A concomitant object of the invention is to provide a hydrostatic seal which occupies little room and comprises a small number of simple parts.

The improved hydrostatic seal comprises a rotary first sealing element, a second sealing element coaxial with and defining with the first element an annular gap for leak fluid, biasing means including one or more closing springs or the like for urging one of the sealing elements toward the other sealing element to reduce the width of the gap, a feed for conveying into the gap water or another fluid at a pressure which normally suffices to oppose the biasing means and to maintain the sealing elements out of contact with each other, and safety means for opposing the biasing means in response to a predetermined drop in fluid pressure so as to maintain the sealing elements out of contact when the pressure of fluid supplied by the feed is insufficient to prevent excessive reduction in the width of the gap.

The novel features which are considered as characteristic of the invention are set forth in particular in the appended claims. The improved hydrostatic seal itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
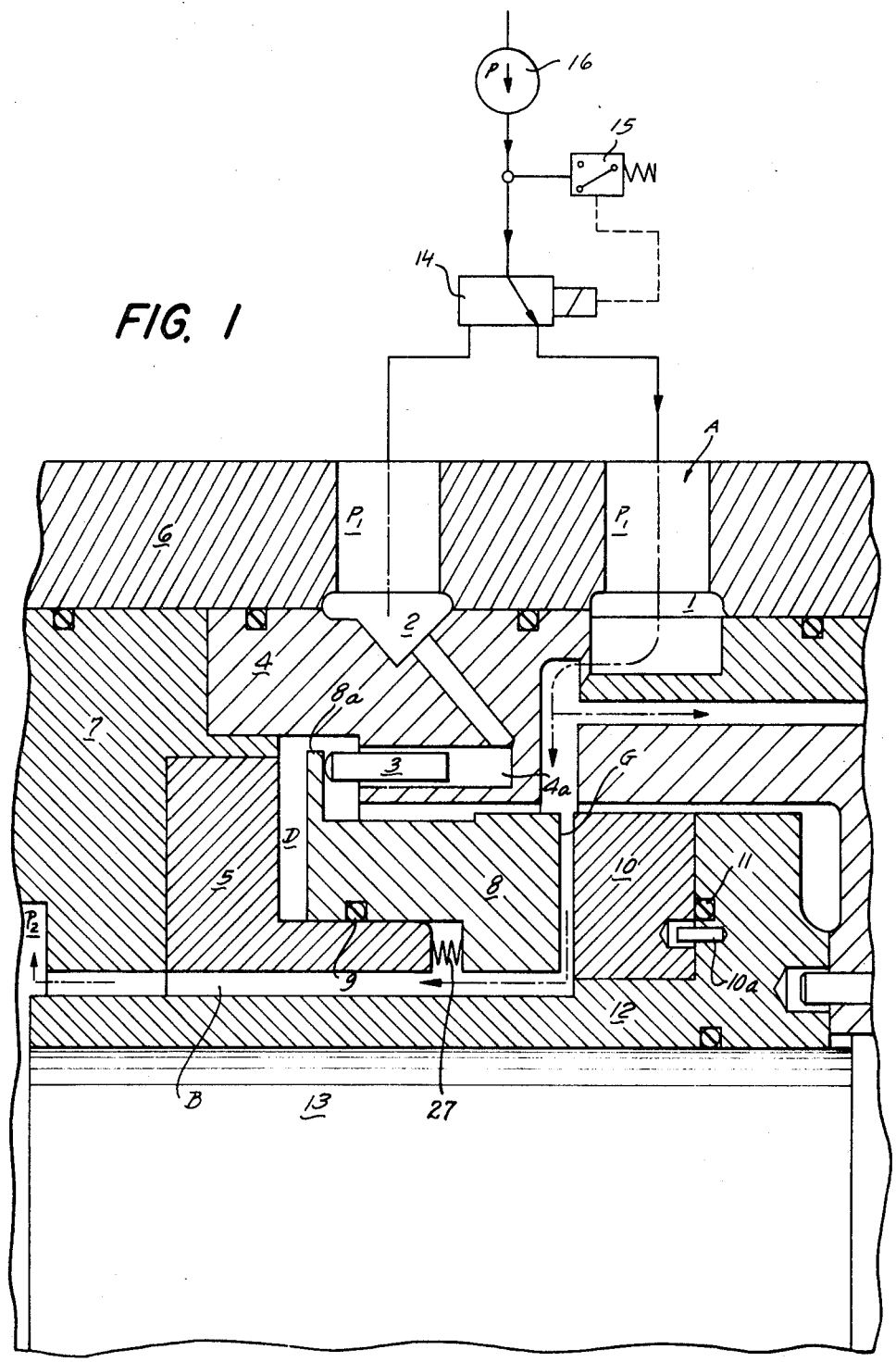
FIG. 1 is an axial sectional view of a hydrostatic seal which embodies one form of our invention.

FIG. 1 illustrates a portion of a pump which can be used in boiling water nuclear reactor systems. A rotary component or shaft 13 carries a protective sleeve 12 and rotates in a housing 6 for a contact-free hydrostatic seal which is constructed and assembled in accordance with a first embodiment of our invention. The seal comprises a first annular sealing element 10 which is connected to the sleeve 12 by one or more posts or pins 10a so that it rotates with the shaft 13. One or more elastic sealing rings 11 prevent leakage of fluid between the sealing element 10 and sleeve 12.

A second annular sealing element 8 surrounds with clearance a portion of the sleeve 12 and normally defines with the sealing element 10 a gap G through which the fluid can leak from a high-pressure space A into a low-pressure space B. The sealing element 8 is axially movably connected to a carrier 5 which is affixed to a supporting cylinder 7 and does not rotate with the shaft 13 and sleeve 12. The cylinder 7 is sealingly received in the housing 6 and the structure shown in FIG. 1 further comprises one or more sealing rings 9 which prevent leakage between the space B and a chamber D provided between the carrier 5 and that end face of the sealing element 8 which faces away from the gap G.

In normal operation, the chamber A receives fluid from a feed pump 16 through an adjustable electromagnetic valve 14 which is controlled by a pressure-responsive switch 15 of known design. The switch 15 monitors the pressure of fluid in a channel 1. The fluid flows through the gap G and its pressure drops during passage through this gap so that the pressure $P_1$ in space A is higher than the pressure $P_2$ in space B. The channel 1 is provided in the housing 6 and in a holder 4 in this housing to normally convey fluid from a first outlet of the valve 14 toward the gap G. A second channel 2 received fluid from a second outlet of the valve 14 when the switch 15 detects that the pressure of fluid issuing from the pump 16 decreases below a predetermined value, namely, below that pressure which is necessary to maintain the sealing element 8 out of contact with the sealing element 10. Fluid entering the channel 2 then exerts pressure against the right-hand end faces of several equidistant shifting elements 3 here shown as plungers installed with clearance in axially parallel bores 4a of the holder 4. The plungers 3 then bear against a flange 8a of the sealing element 8 and shift the latter axially of the shaft 13, i.e., away from the sealing element 10 to insure that the gap G remains open and that the elements 8, 10 cannot rub against each other. The plungers 3 allow some fluid to leak around their peripheral surfaces and to enter the chamber D but the pressure of fluid entering through the channel 2 suffices to move the plungers 3 axially and to shift the flange 8a away from the revolving sealing element 10. The end faces bounding the gap G are preferably configured in a manner as disclosed in FIG. 3 of the copending application Ser. No. 684,856 filed Nov. 21, 1967 by Diederich et al. and assigned to the same assignee. The fluid is preferably pure water. The chamber D communicates with the space A so that fluid leaking around the plungers 3 can flow through the gap G and into the space B. When the pressure of fluid in the connection between the pump 16 and valve 14 rises above the aforementioned minimum value, the switch 15 causes the valve 14 to admit fluid into the channel 1 because the pressure $P_1$ then suffices to maintain the sealing element 8 out of contact with the revolving sealing element 10.

Each plunger 3 is automatically centered in the respective bore 4a by hydrostatic force when the valve 14 admits fluid through the channel 2. This is due to the fact that, if a plunger 3 happens to move radially of the holder 4 so that it is not centered in the respective bore 4a, the wider portion of the clearance between such plunger and the holder 4 allows the fluid to enter the chamber D at a higher speed whereby the fluid pressure in this wider portion of the clearance drops and the plunger automatically seeks to assume a position wherein the width of the clearance is constant all the way around the circumference of the plunger. Friction between the fluid flowing through the clearance around a plunger 3 and the surfaces surrounding the clearance is inversely proportional to the speed of fluid, i.e., the friction is constant in all circumferentially spaced zones of a clearance if the latter's width is uniform. This is achieved when a plunger 3 is centered in the respective bore 4a of the holder 4.

An important advantage of our hydrostatic seal is that the sealing elements 8, 10 remain out of contact even if the differential between the pressures $P_1$ and $P_2$ does not suffice to insure that the width of the gap G remains above zero. Depending on the design of end faces bounding the gap G, the pressure $P_1$ fluctuates between a maximum and a minimum value when the hydrostatic seal operates normally, i.e., when the valve 14 admits fluid to the channel 1. The maximum value of $P_1$ is reached when the sealing elements 8, 10 are in actual contact and the minimum value is reached when the width of the gap G increases to a maximum width. The pressure $P_2$ is a hydrostatic pressure and is normally assisted by one or more springs 27 which tend to move the sealing element 8 axially toward the sealing element 10. This pressure $P_2$ may equal atmospheric pressure. If the differential between the pressures $P_1$ and $P_2$ is constant, the magnitude of closing force tending to move the element 8 into abutment with the element 10 is between the minimum and maximum values of pressure in the space A. When the forces tending to open and close the gap G are balanced, the gap remains open. When the differential between the pressures $P_1$ and $P_2$ decreases, the width of the gap G also decreases because the force of aforementioned spring or springs remains substantially unchanged. The plungers 3 become active when the differential between $P_1$ and $P_2$ is insufficient to insure that the gap G remains open. This is achieved by applying to plungers 3 a force which counteracts the spring force to maintain the gap G open even if the pressure differential $P_1$ minus $P_2$ is too small to prevent movement of sealing element 8 into frictional engagement with the sealing element 10. Since the leakage of fluid through the gap G is small when the pressure $P_1$ is low, the plungers 3 can move the sealing element 8 to a position at a maximum distance from the sealing element 10.

The useful life of our hydrostatic seal depends considerably on the purity of fluid which is being fed by the pump 16. Therefore, the pump 16 preferably supplies a purified fluid. The quantity of fluid fed by the pump 16 is slightly higher than the quantity of fluid which leaks through the gap G.

The fluid accumulating in the space B can be returned to the inlet of the pump 16.

The sealing elements 8 and 10 can consist of ceramic, hard metallic material or austenitic chromium steel coated with layers of hard metal or ceramic. The sealing rings 9, 11 and others shown in FIG. 1 may consist of a synthetic plastic material, preferably ethylene-propylene, and the remaining parts of the seal (including the aforementioned closing springs) may consist of austenitic chromium steel.

Figure 2:
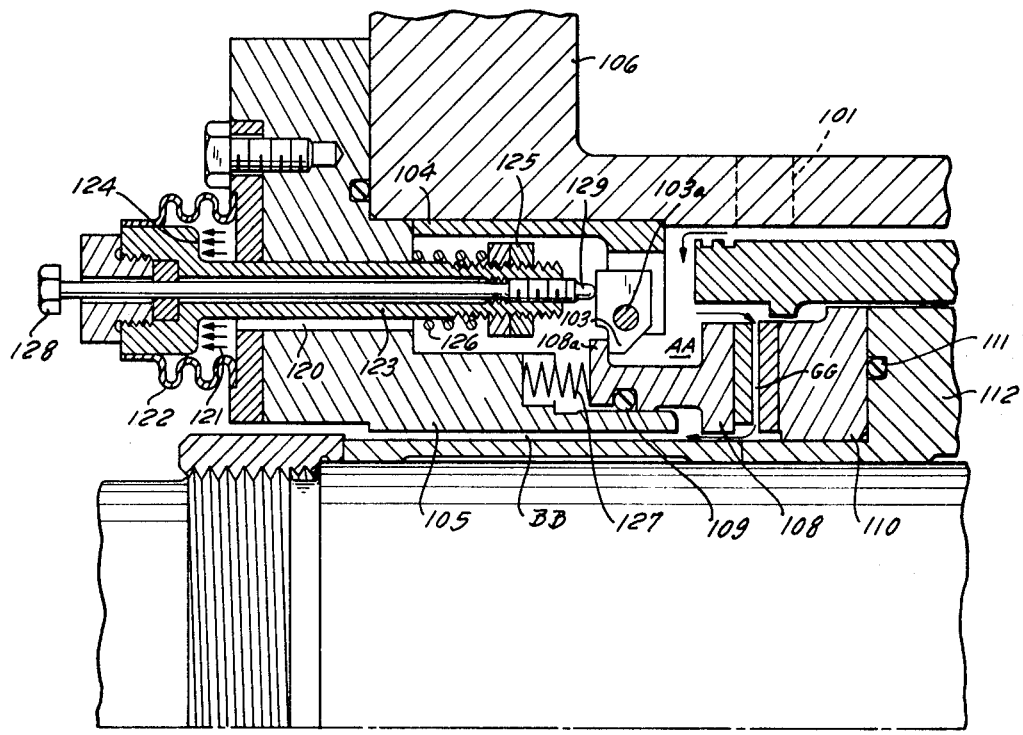
FIG. 2 is a similar axial sectional view of a modified seal.

FIG. 2 illustrates a second hydrostatic seal wherein a shaft 113 rotates with a protective sleeve 112 and the latter carries a rotary first sealing element 110. A second sealing element 108 defines with the sealing element 110 an annular gap GG. The housing 106 has a single channel 101 which receives fluid from a feed pump (not shown). Such fluid enters a space AA and passes through the gap GG to enter a space BB. The space AA further admits pressurized fluid into a passage 120 which communicates with a chamber 121 surrounded by a flexible bellows 122. The numerals 109, 111 respectively denote sealing rings for the sealing elements 108, 110. The carrier 105 for the axially movable sealing element 108 defines the aforementioned passage 120 and supports the bellows 122. The sealing element 108 has an annular flange 108a which can be engaged by a rockable shifting member 103 here shown as a two-armed lever which is fulcrumed at 103a and is supported by a holder 104. The means for rocking the lever 103 in a clockwise direction so that the lower arm of the lever bears against the flange 108a and moves the sealing element 108 away from the sealing element 110 comprises a piston 123 having a shoulder 124 located in the chamber 121 and a collar 125 located in the space AA. The piston 123 is movable in parallelism with the axis of the shaft 113 and extends through a bore of the carrier 105. Its left-hand end is sealingly secured to the bellows 122. A helical expansion spring 126 operates between the collar 125 and carrier 105 to bias the piston 123 to the right. The bias of this spring is opposed by fluid pressure in the chamber 121 if such pressure is high enough to overcome the pressure of leak fluid in the space BB plus the bias of one or more closing springs 127 operating between the carrier 105 and sealing element 108.

The piston 123 meshes with an adjustable screw 128 whose tip 129 moves into abutment with the upper arm of the lever 103 when the spring 126 is free to overcome the fluid pressure against the shoulder 124. The purpose of the screw 128 is to prevent excessive widening of the gap GG when the spring 126 is free to move the piston 123 and screw 128 in a direction to the right, as viewed in FIG. 2. Thus, when the seal operates normally (namely, when the fluid pressure in the space AA suffices to overcome the pressure of leak fluid in space BB plus the bias of springs 126 and 127), the tip 129 of the screw 128 can be spaced from the lever 103, and the distance between the tip 129 and the upper arm of the lever 103 can be selected in such a way that the lever is rocked only when the pressure in chamber AA drops to a predetermined minimum value. Such minimum pressure can be determined by simple calculation or by experimentation.

The screw 128 can be said to constitute an adjustable portion of the piston 123. The bellows 122 can be made of austenitic chromium steel.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What we claim as new and desired to be protected by Letters Patent is set forth in the appended claims:

1. A contact-free hydrostatic seal for controlling leakage of fluids between stationary and moving components, comprising a rotary first sealing element; a second sealing element coaxial with and defining with said first sealing element a gap; biasing means urging one of said sealing elements axially toward the other sealing element to reduce the width of said gap; pump means for conveying fluid into said gap fluid at a variable pressure which normally suffices to oppose said biasing means and to maintain said sealing elements out of contact with each other; and safety means for opposing said biasing means in response to a predetermined drop in fluid pressure so as to maintain said elements out of contact when the pressure of fluid supplied by said pump means is insufficient to prevent excessive reduction in the width of said gap, said safety means comprising fluid-actuated shifting means movable against said one sealing element to move the latter away from the other sealing element and including plunger means having a first end movable against said one sealing element and a second end, and holder means defining a bore receiving said plunger means with radial clearance, said holder means having channel means for conveying fluid against said second end of said plunger means, said safety means comprising further means for diverting fluid supplied by said pump means against said shifting means in response to a predetermined drop in pressure of said fluid, said diverting means comprising adjustable valve means normally arranged to permit the fluid to flow from said pump means into said gap and monitoring means arranged to detect the pressure of fluid and to adjust said valve means in response to said predetermined drop in fluid pressure so that said valve means then supplies fluid to said channel means.

2. A hydrostatic seal as defined in claim 1, wherein said bore communicates with said gap.

3. A hydrostatic seal as defined in claim 1, wherein said one sealing element is said second sealing element and wherein said first sealing element rotates with reference to said second sealing element.